(12) United States Patent
Weilbacher et al.

(10) Patent No.: US 6,246,127 B1
(45) Date of Patent: Jun. 12, 2001

(54) TRANSMISSION CONTROL DEVICE

(75) Inventors: Dieter Weilbacher, Flörsheim; Klaus Mayer, Obertshausen, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/336,304

(22) Filed: Jun. 19, 1999

(30) Foreign Application Priority Data

Jun. 24, 1998 (DE) .............................................. 198 28 039

(51) Int. Cl.⁷ ...................................................... B60L 1/00
(52) U.S. Cl. .......................... 307/9.1; 301/10.1; 340/456
(58) Field of Search ................................... 307/9.1, 10.1;
74/473.1, 483 PB, 473.31; 477/79; 340/456,
425.5, 438; 446/7; 364/421.1; 200/61.88,
61.54; 701/36.51, 64

(56) References Cited

U.S. PATENT DOCUMENTS

| 4,265,047 | * | 5/1981 | Meyer et al. | 46/232 |
| 4,281,736 | * | 8/1981 | Lizzio | 180/271 |
| 4,790,204 | * | 12/1988 | Tury et al. | 47/483 |
| 4,884,057 | * | 11/1989 | Leorat | 340/456 |
| 5,425,686 | * | 6/1995 | Grange | 477/79 |
| 5,957,001 | * | 9/1999 | Gualtieri et al. | 74/473.12 |

FOREIGN PATENT DOCUMENTS

| 3781599 | 12/1987 | (DE) . |
| 3929268 | 3/1991 | (DE) . |
| 19509472 | 9/1996 | (DE) . |
| 19624686 | 1/1997 | (DE) . |
| 2672952 | 8/1992 | (FR) . |

* cited by examiner

*Primary Examiner*—Josie Ballato
*Assistant Examiner*—Sharon Polk
(74) *Attorney, Agent, or Firm*—Martin A. Farber

(57) ABSTRACT

A control device (1) for a motor vehicle, for an automatic or semi-automatic transmission, is provided on a supporting arm (2). The control device comprises two actuation elements (7, 8), comprising as touch contact switches (5, 6), and a liquid crystal display (3) which, in addition to the shifting position which has been set, also represents all the other possible shifting positions. The control device (1) is located in constant field of vision of the motor vehicle driver and thus makes control easier.

18 Claims, 2 Drawing Sheets

TRANSMISSION CONTROL DEVICE

FIELD AND BACKGROUND OF THE INVENTION

The invention relates to a control device for a motor vehicle which comprises a supporting arm with an actuation element which is arranged in an area of the free end of the supporting arm, said control device being arranged in the vicinity of a steering wheel of the motor vehicle.

Such control devices are used in contemporary motor vehicles in order to arrange a plurality of actuation elements within the reach of the motor vehicle driver, in particular in an area which can be accessed indirectly or directly by a hand of the motor vehicle driver which is resting on the steering wheel, and thus arranged in the vicinity of the steering wheel. For this purpose, the control devices, which are also referred to as satellites, project outward in each case with the supporting arm extending in a lateral direction between the dashboard and the steering wheel, and usually having an actuation element at its free end.

In the known devices the fact that an increased level of attention is required from the motor vehicle driver to read the shifting position of the actuation elements proves disadvantageous. This is the case in particular if the actuation element has more than two shifting positions. Here, the motor vehicle driver must firstly determine the shifting position of the actuation element at a given time and subsequently take hold of the element, the motor vehicle driver having to direct his attention once more to the position of the actuation element which differs depending on the shifting position. Finally, in most cases the motor vehicle driver must also ensure whether he has also actually set the desired shifting position since the markings or symbols on the switch are often covered by his hand or by the steering wheel during the actuation of the actuation element and therefore cannot be read.

Other control devices are known in which a shifting position display connected to the actuation element is arranged in the dashboard. As a result, the shifting position display lies in the constant field of vision of the motor vehicle driver. It proves to be disadvantageous here that at first it is necessary for the motor vehicle driver to perform an adjustment between the actuation element and the shifting position and thus whenever actuation is performed at first attention must be directed to Lhe display and then to the actuation element and subsequently to the display again. This procedure may have to be repeated until the desired shifting position is reached.

It is a disadvantage in both embodiments that they require a considerable degree of attention from the motor vehicle driver, as a result of which he looks away from the conditions on the road, and in addition an acclimatization phase is necessary for reliable actuation. These disadvantages resulted in such control devices frequently receiving a critical assessment in the past.

SUMMARY OF THE INVENTION

The present invention is based on the problem of providing a control device of the type mentioned at the beginning in such a way that its control is made significantly easier and at the same time requires significantly less attention than the known devices.

This problem is solved according to the invention wherein the actuation element is a touch contact switch with which a shifting position of a transmission or the preselected gear speed (shift stage) of an automatic transmission can be changed incrementally and wherein the supporting arm has a visual display for showing the shifting position or preselected gear speed. Such an arrangement has the advantage that the visual display which is arranged on the supporting arm is arranged in the constant field of vision of the motor vehicle driver. This display informs the motor vehicle driver of the shifting position which has been set and which cannot be read directly from the touch contact switch. Here, the display also remains visible during actuation so that any control errors can immediately be detected and corrected. At the same time, owing to the design as a touch contact switch, the position of the actuation element remains unchanged in the various shifting positions. The control of the control device according to the invention therefore requires only a small degree of attention from the motor vehicle driver. In particular, at least after a brief acclimatization phase it is no longer necessary for the driver to look away from the conditions on the road in order to operate the touch contact switch.

A particularly favorable embodiment of the device is obtained if the position of the free end of the supporting arm can be adjusted individually, as a result of which the ease of operation is increased further particularly in terms of the different physical sizes of different motor vehicle drivers and permits convenient control of the touch contact switch. For example, a ball-and-socket joint which can be secured in the desired setting is suitable for this.

It is also advantageous here if the supporting arm is flexible. This makes it possible to perform the individual setting in a particularly easy way. Means for securing the supporting arm in the selected position are not necessary since the supporting arm maintains the selected setting. Furthermore, in the event of a possible accident the risk of injury is reduced by the flexible design.

A particularly reliable embodiment is obtained if the supporting arm is a swan neck. This is distinguished especially by its continuous load capability, hardly any fatigue phenomena occurring even when settings are changed frequently. Electric leads and contacts may be positioned in the interior of the hollow swan neck.

A particularly advantageous development of the invention is obtained if the supporting arm is inclined toward the motor vehicle driver. This provides significantly improved accuracy of reading the visual display even under unfavorable circumstances. For example, troublesome reflections of the visual display can be reduced. In addition, the operation of the touch contact switch is also made easier by the alignment in an ergonomically favorable orientation.

One advantageous embodiment of the invention is that the visual display is a liquid crystal display. The possibility of easy and clear reading of the shifting position which is displayed in this way is particularly advantageous here. For example, the selected gear speed or the program of an automatic transmission can be displayed as a symbol, as a word or in some other suitable way.

It is also particularly advantageous if the liquid crystal display and/or the touch contact switch is made so that it can be illuminated. It makes operation significantly easier when the light conditions are favorable. For this purpose, the touch contact switch has, for example, a symbol which can be illuminated or a characteristic shaped element which can be illuminated from the rear and by means of which the touch contact switch can be easily distinguished and mistaken access is prevented. The liquid crystal display preferably has a background illumination which provides a sharp contour and thus easy readability.

One advantageous development of the invention is obtained if the touch contact switch is a rocker switch. This permits actuation starting from the set shifting position in such a way that it is possible to set one of the two adjacent shifting positions as desired. In order to arrive at the preceding shifting position in this embodiment, it is therefore not necessary firstly to select in succession all the other shifting positions in order finally to arrive at the desired setting. It is appropriate here to arrange the rocker switch in a way which permits a logical relationship between the direction of actuation and the possible shifting positions represented in the visual display.

An advantageous development in which inadvertent incorrect control can be avoided can be obtained if the supporting arm has a further touch contact switch. As a result, incorrect actuation, in particular as a result of the movements of the vehicle which are transmitted to the motor vehicle driver can reliably be avoided, as a result of which the possibility of the driving safety being placed in jeopardy as a result of inadvertent selection of the wrong shifting position is largely avoided.

It is also advantageous if the touch contact switch has a bulge or recess. This is a particularly advantageous way of preventing the tips of the fingers from slipping off and thus possibly moving over to another actuation element.

The operation of the touch contact switch is particularly simple if the touch contact switch is arranged at the side of the free end of the supporting arm. This embodiment permits the motor vehicle driver to operate the touch contact switch without having to previously remove his hand from the steering wheel. The motor vehicle driver merely has to move one finger on his hand and can actuate the touch contact switch by means of a slight movement of the tip of the finger. At the same time, he maintains a firm grip on the steering wheel.

One development of the invention is obtained if the liquid crystal display is designed to represent further signals which relate to the shifting position or preselected gear speed. This utilizes the simple and logical relationship between the visual display and the control device in an optimum way and is supplemented with further information such as, for example, proposals from the on-board computer for the correct selection of the shifting position. Symbols whose meaning can be recognized immediately with a glance are especially suitable for this.

An embodiment of the device according to the invention is particularly beneficial if the touch contact switch is designed to select the shifting position of a semiautomatic transmission which is known, for example, by the name Tiptronic gear shift. In contrast to an automatic transmission which merely requires the desired driving program to be selected in advance, in a Tiptronic gear shift the desired gear speed must be set by the motor vehicle driver himself. The relatively frequent access which is associated with this is significantly simplified with the invention.

BRIEF DESCRIPTION OF THE DRAWINGS

The invention permits various embodiments. In order to clarify its basic principle further, one of these embodiments is represented in the drawing and is described below. In said drawings.

DETAILED DESCRIPTION OF THE PREFERRED EMBODIMENT

Figure 1:
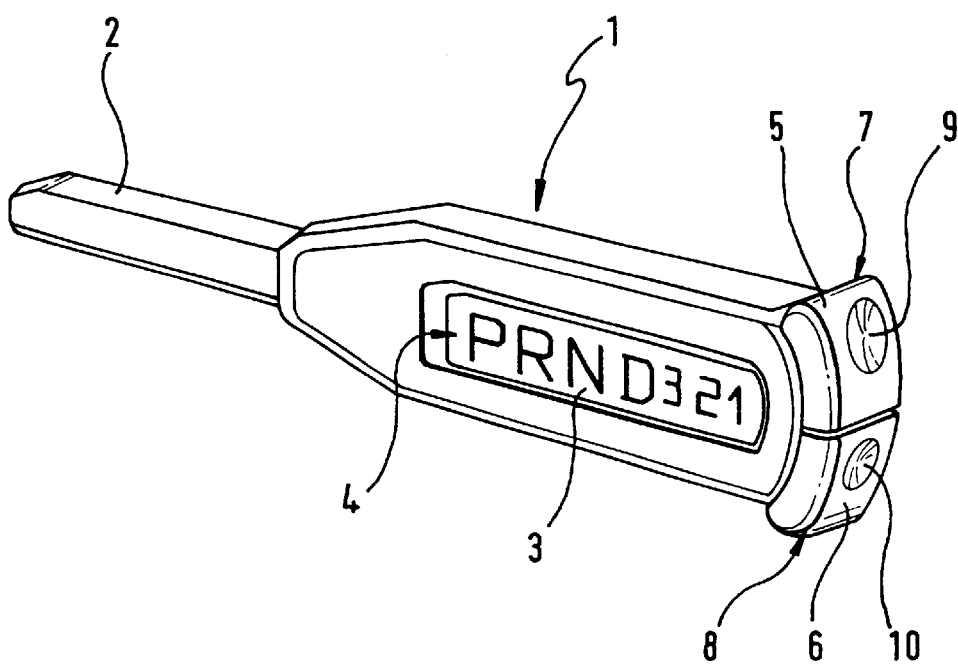
FIG. 1 shows a control device according to the invention with a supporting arm which is represented only in part.

FIG. 1 shows a control device 1 according to the invention which comprises a supporting arm 2 (represented only in part), a liquid crystal display 3 which is designed as a visual display 4, and two actuation elements 7, 8 which are arranged one on top of the other, constructed as touch contact switches 5, 6 and are provide to set the desired shifting position. All the switching positions which can be set are designated on the liquid crystal display 3 with a letter symbol or numerical symbol and are continuously visible, the shifting position which is set being highlighted visually, for example by representing the symbol in a different color. When one of the two actuation elements 7 or 8 is actuated, one of the two adjacent shifting positions becomes set starting from the shifting position which has been set. For the sake of simplified actuation, the actuation elements 7, 8 each have on their outwardly facing surface a recess 9, 10 which improves the contact between a fingertip of the motor vehicle driver and the actuation element 7, 8, and makes it easier to find the actuation element 7, 8 without visual contact.

Figure 2:
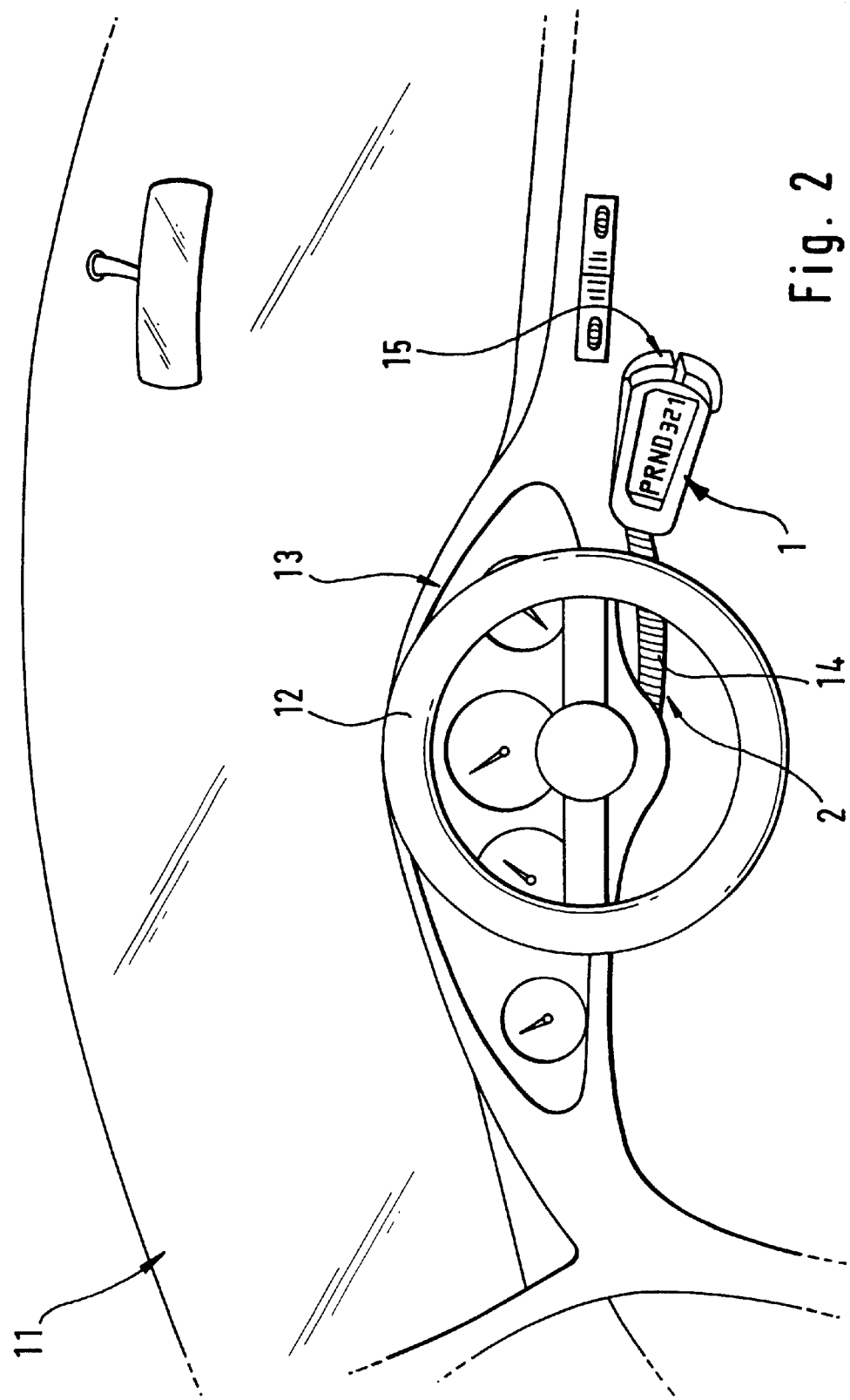
FIG. 2 shows a detail of a vehicle cockpit with the control device from FIG. 1 from a driver's angle of vision.

FIG. 2 shows a detail of a vehicle cockpit 11 with a steering wheel 12 and a dashboard 13 from a driver's angle of vision. Between the dashboard 13 and the steering wheel 12, the control device 1 which is represented in FIG. 1 projects in a lateral direction with the free end 15 of the supporting arm 2. For the purpose of improved readability, the control device 1 is inclined toward a motor vehicle driver (not represented). For this purpose, the supporting arm 2 is shifting in part as a flexible swan neck 14 and thus permits individual adaptation to different motor vehicle drivers and their sitting positions.

What is claimed is:

1. A control device for a motor vehicle which comprises, a supporting arm with an actuation element which is arranged on the supporting arm in an area of a free end of the supporting arm, said supporting arm and actuation element being arrangeable in an adjacent vicinity of a steering wheel of the motor vehicle, and wherein the actuation element (7, 8) is a touch contact switch (5, 6) by which a shifting position of a transmission or a preselected gear speed of an automatic transmission of the motor vehicle is changeable incrementally, and wherein the supporting arm (2) has a visual display in the area of the free end of the supporting arm for showing the shifting position or preselected gear speed, the supporting arm being mountable on the vehicle such that the visible display and the actuation element are located in said adjacent vicinity of the steering wheel with the actuation element being within reach of a tip of a finger of a driver's hand while holding the steering wheel.

2. The control device as claimed in claim 1, wherein the position of the free end (15) of the supporting arm (2) can be adjusted individually.

3. The control device as claimed in claim 1, wherein the supporting arm (2) is flexible.

4. The control device as claimed in claim 3, wherein the supporting arm (2) is a swan neck (14).

5. The control device as claimed in claim 1 wherein the supporting arm (2) is inclined toward a motor vehicle driver.

6. The control device as claimed in claim 1, wherein the visual display is a liquid crystal display (3).

7. The control device as claimed in claim 6, wherein the liquid crystal display (3) is illuminable.

8. The control device as claimed in claim 6, wherein the liquid crystal display (3) represents further signals which relate to the shifting position or preselected gear speed.

9. The control device as claimed in claim 1, wherein said touch contact switch (5, 6) is a rocker switch.

10. The control device as claimed in claim 1, wherein the supporting arm (2) adjacent said touch contact switch has a further touch contact switch (5, 6) wherein one of said touch contact switches shifts in one direction and the other of said touch contact switches shifts in an opposite direction.

11. The control device as claimed in claim 1, wherein the touch contact switch (5, 6) is formed with a recess (9, 10).

12. The control device as claimed in claim 1, wherein the touch contact switch (5, 6) is arranged on the side of the free end (15) of the supporting arm (2) enabling actuation by the tip of the driver's finger while holding the steering wheel.

13. The control device as claimed in claim 1, wherein the touch contact switch (5, 6) selects the shifting position of a semi-automatic transmission.

14. The control device as claimed in claim 1, wherein the touch contact switch is illuminable.

15. The control device as claimed in claim 1, wherein the touch contact switch is formed with a bulge.

16. The control device according to claim 1, wherein the touch contact switch and the visual display are adjacent to each other and wherein said visual display is positioned adjacent and outwardly beyond the steering wheel, the supporting arm being arranged in a direct access region of the driver's hand while resting on the steering wheel, the supporting arm projecting laterally between the steering wheel and a dashboard of the vehicle.

17. A control device for a motor vehicle which comprises a supporting arm with an actuation element which is arrangeable on the supporting arm in an area of a free end of the supporting arm, said supporting arm and actuation element being arrangeable in the adjacent vicinity of a steering wheel of the motor vehicle, wherein the actuation element is a touch contact switch by which a preselected gear speed of an automatic transmission of the motor vehicle is changeable incrementally, and wherein the supporting arm has a visual display for showing the preselected gear speed, the supporting arm being mountable on the vehicle such that the visible display and the actuation element are located in said adjacent vicinity of the steering wheel with the actuation element being within reach of a tip of a finger of a driver's hand while holding on the steering wheel.

18. A control device for a motor vehicle which comprises a supporting arm with an actuation element which is arrangeable on the supporting arm in an area of a free end of the supporting arm, said supporting arm and actuation element being arrangeable in the adjacent vicinity of a steering wheel of the motor vehicle, wherein the actuation element is a touch contact switch with which a shifting position of a transmission of the motor vehicle is changeable incrementally, and wherein the supporting arm has a visual display for showing the shifting position, the supporting arm being mountable on the vehicle such that the visible display and the actuation element are located in said adjacent vicinity of the steering wheel with the actuation element being within reach of a tip of a finger of a driver's hand while holding the steering wheel.

* * * * *